J. Haslam.
Nut Machine.
Nº 65,380. Patented Jun. 4, 1867.
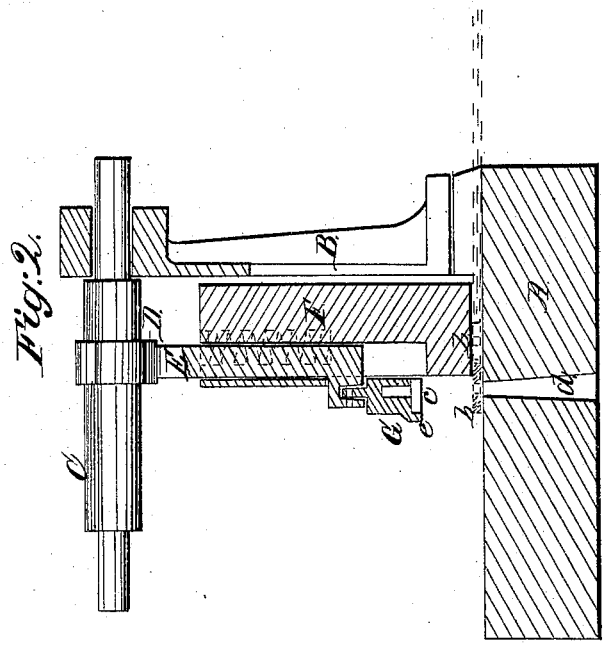
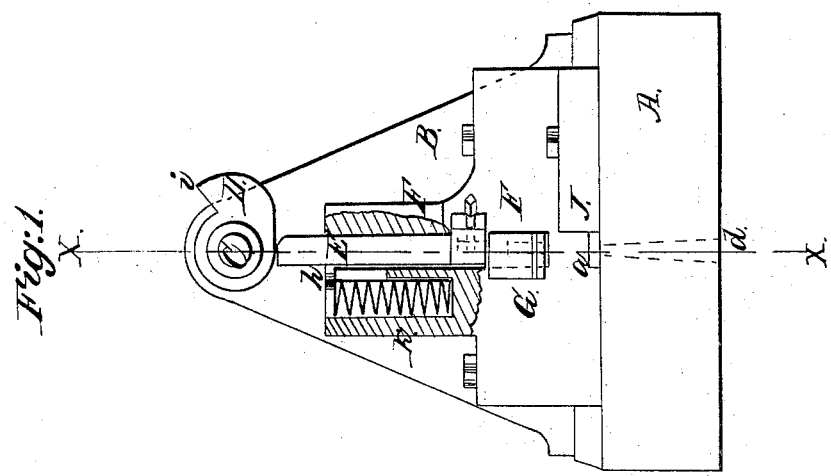
Witnesses:
Alex. F. Roberts.
Fred B. Miles.
Inventor:
James Haslam
per Munn & Co
Attorneys.

United States Patent Office.

JAMES HASLAM, OF PHILADELPHIA, PENNSYLVANIA, ASSIGNOR TO M. J. COLEMAN, OF SAME PLACE.

Letters Patent No. 65,380, dated June 4, 1867.

IMPROVEMENT IN NUT MACHINES.

The Schedule referred to in these Letters Patent and making part of the same.

TO ALL WHOM IT MAY CONCERN:

Be it known that I, JAMES HASLAM, of Philadelphia, in the county of Philadelphia, and State of Pennsylvania, have invented a new and useful Improvement in Nut Machines; and I do hereby declare that the following is a full, clear, and exact description thereof, which will enable others skilled in the art to make and use the same, reference being had to the accompanying drawings forming part of this specification.

The object of this invention is to overcome some difficulties which have hitherto been met with in the manufacture of nuts, and it consists in arranging a catch upon the end of the vertical slide-bar, which, by the old process, holds the nut while it is being squared, whereby the nut is caught and held in position, as will be hereinafter more fully explained. In describing this my invention I have not deemed it necessary to show the whole nut machine, but confine myself in this description to the section of it which contains the part which embraces my catch, but so that its operation and use can be fully understood.

Figure 1 represents a front view with a portion broken away to show the spring which throws up the vertical slide-bar.

Figure 2 is a vertical section of fig. 1, through the line $x\ x$.

Similar letters of reference indicate like parts.

A represents the foundation plate; B is a stand which supports the horizontal shaft which operates the cam; C is the shaft; D is the cam; E is the vertical slide-bar; F is a block, which rests upon the foundation A, through which the slide E passes, and by which it is guided; G is the catch which is attached to the end of the bar, and held by a set-screw. The nut marked $b$ is pushed through the hole $a$, fig. 1, while the catch G is down. $i$ is a recess in the catch which receives the nut. The lip or flange $e$ on the catch confines it and keeps it square in its place. While in this position a pin passes up through the hole $d$ in the bed-plate A, and having a shoulder near its upper end, it raises the nut as the bar and catch are raised, and holds it above the hole $a$ until it receives blows upon its edges, which square and true it. In this operation of squaring and smoothing the nut, the block F answers the purpose of an anvil on one side, and another block marked J, is the anvil for the other side. As soon as the squaring and truing is completed, which operation requires but a moment's time, the pin at $d$ is withdrawn from the nut, and it is left upon the bed as represented in fig. 2, but it is immediately shoved along by the next nut, when the catch G is thrown down by the cam and confines the new nut as it did the one before, and the operation is repeated. The particular form of the cam will be noticed. When the point $i$ leaves the slide-bar E, the bar is instantly thrown up by the spring $k$, which is confined in a recess in the block F, as seen in the drawing. The slide has a wing upon its side, as seen at $h$, against which the spring acts. All the movements necessary for feeding in and finishing the nuts are obtained by the usual mechanical means.

What I claim as new, and desire to secure by Letters Patent, is—

The catch G, constructed and arranged substantially as described, in combination with a nut machine for the purposes set forth.

The above specification of my invention signed by me this 18th day of February, 1867.

JAMES HASLAM.

Witnesses:
WM. F. MCNAMARA.
ALEX. F. ROBERTS.